United States Patent [19]
Joshi et al.

[11] Patent Number: 5,290,405
[45] Date of Patent: Mar. 1, 1994

[54] NAOH PRODUCTION FROM CERAMIC ELECTROLYTIC CELL

[75] Inventors: Ashok V. Joshi; Meilin Liu, both of Salt Lake City, Utah; Alf Bjorseth, Oslo, Norway; Lars Renberg, Stockholm, Sweden

[73] Assignee: Ceramatec, Inc., Salt Lake City, Utah

[21] Appl. No.: 843,509

[22] Filed: Feb. 28, 1992

Related U.S. Application Data

[63] Continuation-in-part of Ser. No. 705,364, May 24, 1991, abandoned.

[51] Int. Cl.$^5$ .................. C25B 1/16; C25B 9/00
[52] U.S. Cl. .................. 204/98; 204/103; 204/129; 204/252
[58] Field of Search .................. 204/82, 90, 91, 92, 204/93, 94, 95, 98, 103, 104, 252, 253, 295, 421, 296, 422, 424, 129; 429/33, 191, 192; 252/62.2

[56] References Cited

U.S. PATENT DOCUMENTS 4,119,503 10/1978 Spaziante et al. .................. 204/95
4,990,413 2/1991 Lee et al. .................. 429/193

OTHER PUBLICATIONS

Kudo et al., Solid State Ionics, pp. 107–108, Nasicon and Related Oxoacid Salts, no date given.
Aquatech Bipolar Membrane System (advertising materials), 1985.
Basta, Nicholas. "Use Electrodialytic Membranes For Waste Recovery", *Chemical Engineering*, Mar. 3, 1986.
"Bipolar membrane systems available for pilot leasing", *Chemical Processing*, Sep. 1986, p. 119.
Chowhury, Jayadev. "New chlor-alkali methods", *Chemical Engineering*, Apr. 30, 1984, pp. 22–27.
"Production of Acid and Caustic From Salt (Ion Substituion)", [press release], Ionics Incorporated, no date available.
Wett, Ted. "The Edge in Electrolyzers", *Chemical Business*, Jul. 1989, pp. 41–44.
Winnick, Jack. "Electrochemical Membrane Gase Separation", *Chemical Engineering Progress*, Jan. 1990, pp. 41–46.

*Primary Examiner*—Kathryn Gorgos
*Attorney, Agent, or Firm*—Trask, Britt & Rossa

[57] ABSTRACT

A electrolytic cell for efficiently producing caustic from sodium salts via use of a thin membrane of ceramic or ceramic composite electrolyte is disclosed. Ceramic electrolytes having a very mobile sodium ion such as NASICON are very effective in cells producing concentrated caustic from sodium salts of strong acids.

34 Claims, 14 Drawing Sheets

OVERALL REACTION

$$Na_2SO_4 + 3 H_2O \longrightarrow 2 NaOH + H_2SO_4 + H_2 + 1/2\, O_2$$

72 KWhrs PRODUCES $\begin{cases} 40 \text{ Kg NaOH} \\ 49 \text{ Kg } H_2SO_4 \\ 1 \text{ Kg OR } 11.2 \text{ M}^3 H_2 \\ 8 \text{ Kg OR } 5.6 \text{ M}^3 O_2 \end{cases}$

NAOH PRODUCTION FROM CERAMIC ELECTROLYTIC CELL

RELATED APPLICATIONS

This is a continuation in continuation-in-part of pending U.S. application Ser. No. 705,364 which was filed May 24, 1991 now abandoned and is assigned to the same assignee as herein.

BACKGROUND OF INVENTION

1. Field

The instant invention relates to the production concurrently, strong acids via electrolysis of a sodium salt in an electrolytic cell.

2. State of the Art

Electrolytic cells employing composite polymeric membranes are presently utilized to produce caustic solutions. Exemplary of such electrolytic cells are those disclosed in an article entitled "Use Electrodialytic Membranes for Waste Recovery," Nicholas Basta, *Chemical Engineering*, Mar. 3, 1986 and an article entitled "The Behavior of Ion Exchange Membranes in Electrolysis and Electrodialysis of Sodium Sulphate," J. Jorissen and K. H. Simmrock, *Journal of Applied Electrochemistry* 1991. Such cells have polymeric membranes which are not efficient at higher concentrations of caustic and acid as well as at higher conversion ratios of salt to acid although being resistant to strongly acidic and basic solutions. The operational life of such polymeric membranes is very sensitive to impurity contaminations. For example, such cells are limited generally to caustic production of a maximum concentration of about 20% and to salt to acid conversion of about 50%. Higher caustic concentrations or salt to acid conversion severely limit the efficiency of the process. For instance, at a fifty percent conversion of salt to acid, the current or energy efficiency is only about sixty percent.

SUMMARY OF THE INVENTION

The novel electrochemical cell of the instant invention is particularly useful for producing, via electrolysis, a concentrated caustic (NaOH) solution from a sodium salt solution, preferably concentrated, in which the salt has an anion derived from a strong acid, especially sulfuric acid. The cell has an anolyte chamber, a catholyte chamber, a pair of electrodes and a cation-conducting ceramic membrane, such as NASICON (Na [sodium] super ion conductor), separating the anolyte chamber from the catholyte chamber.

Contrary to polymeric membranes, electrochemical cells having a ceramic membrane display high current efficiency such that at a one to one, proton to sodium ion, conversion rate (fifty percent), the current efficiency is about 94% or greater. At about 80% salt to acid conversion, the current efficiency is about 86% (polymers drop to about 20%). The novel cell of this invention operates at a relatively low temperature, generally less than 100° C., to produce a concentrated caustic solution in the catholyte chamber and a relatively concentrated acid, for example, sulfuric acid, in the anolyte chamber. The cell can operate either continuously or in a batchwise fashion. Hydrogen gas is produced in the catholyte chamber while oxygen is produced in the anolyte chamber via the electrolysis of water present in each chamber. The cell may also be used to produce caustic and chlorine from NaCl solutions.

The cell is unique in its ability to utilize a unitary i.e. monolithic, or composite ceramic membrane which is durable in concentrated caustic solution and a strong acid. The ability of the cell to produce caustic in concentrations up to about 50% NaOH is very advantageous. Conventional polymeric membrane electrolytic cells are limited to caustic concentrations of about 20% NaOH, thereby requiring considerable evaporation to achieve concentrated caustic or dry, solid NaOH. Evaporation is an energy-inefficient operation.

In addition, unlike polymeric membranes which can be damaged by trace amounts of alkaline earth metal cations ($Ca^{++}$, $Mg^{++}$), ceramic membranes are relatively less affected by impurity contaminants. Accordingly, for the systems based on polymeric membranes, pretreatment of a feed sodium salt solution to remove contaminants is an expensive process.

Figure 4:
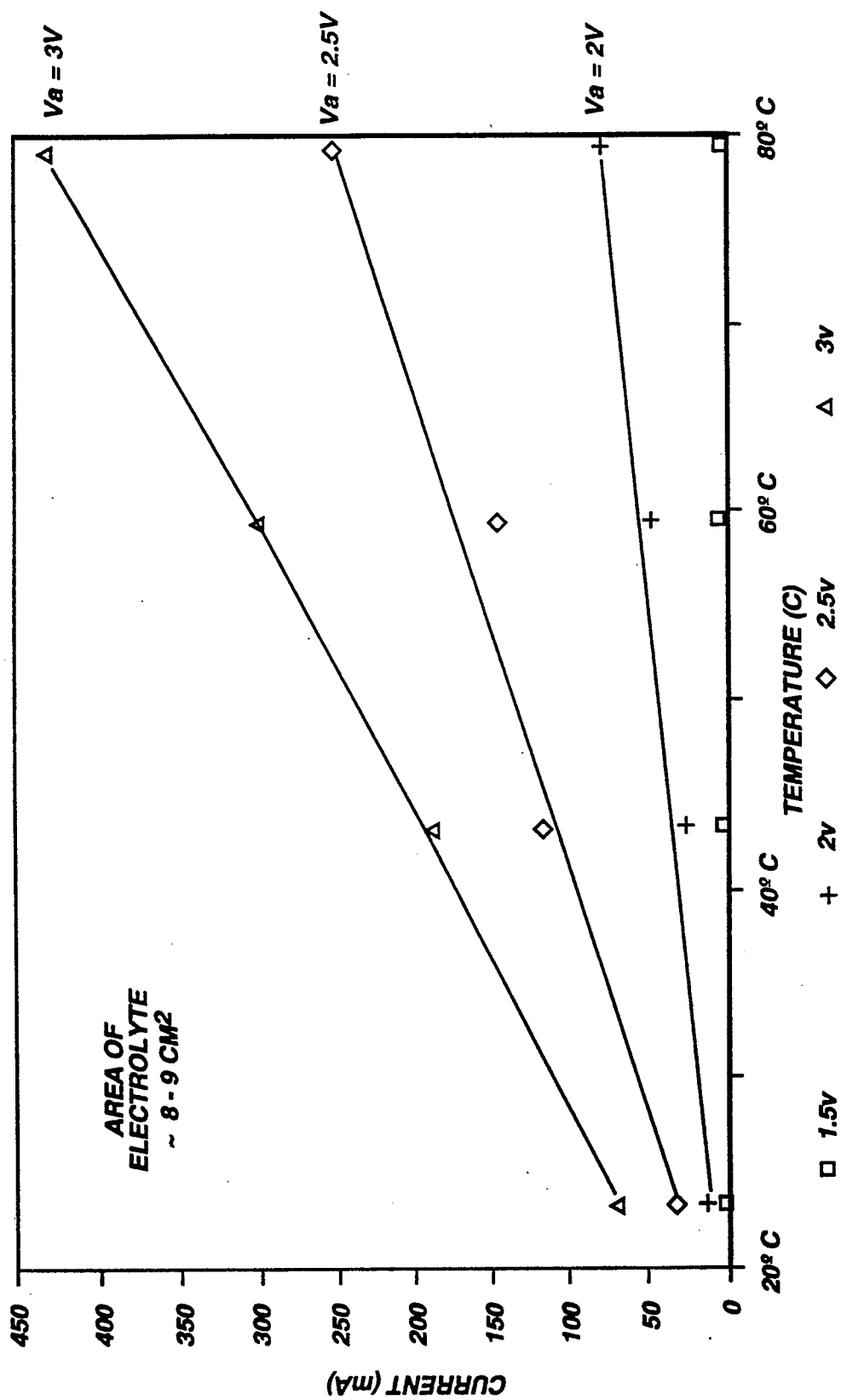
Figure 5:
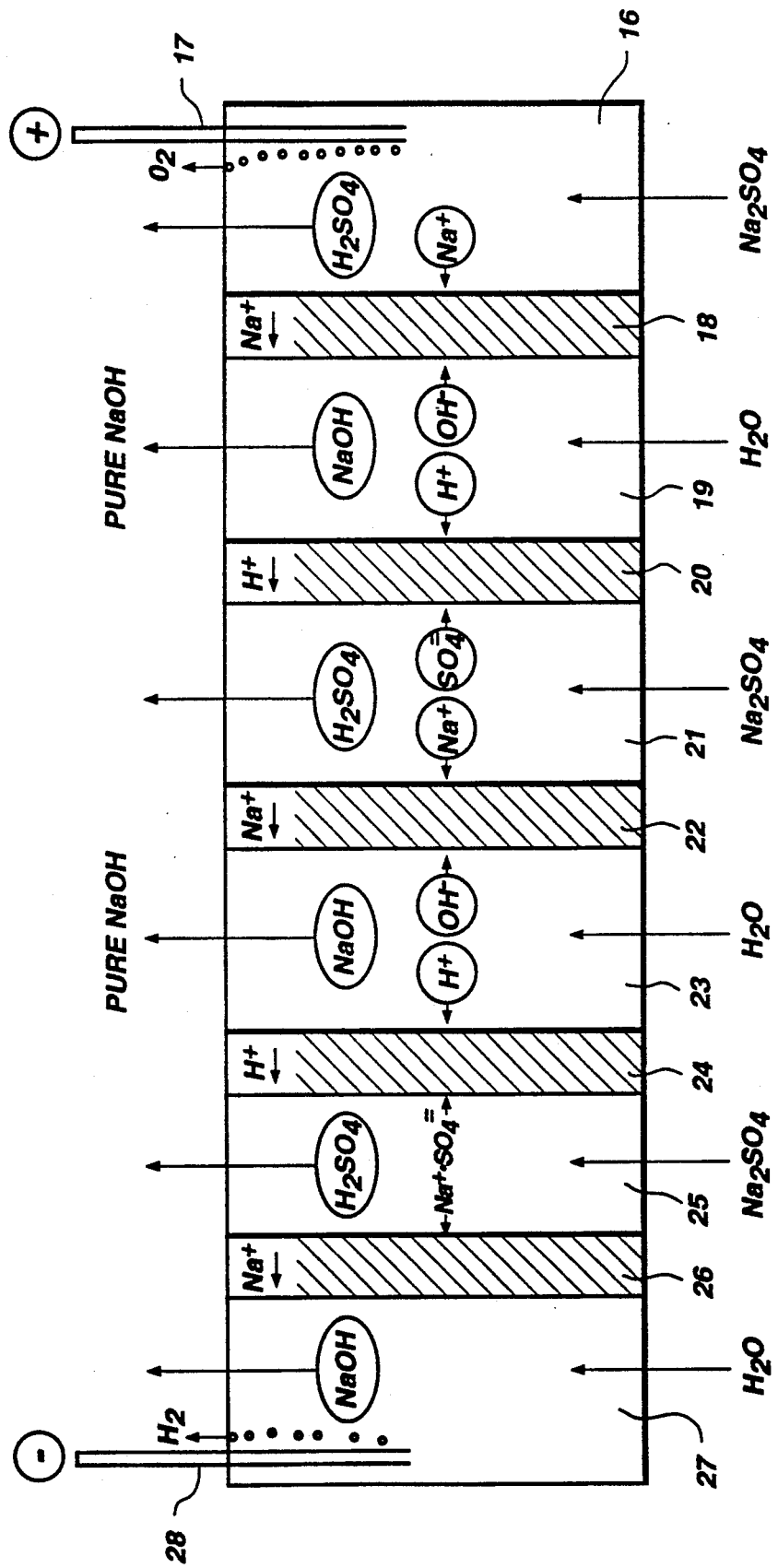
Figure 6A:
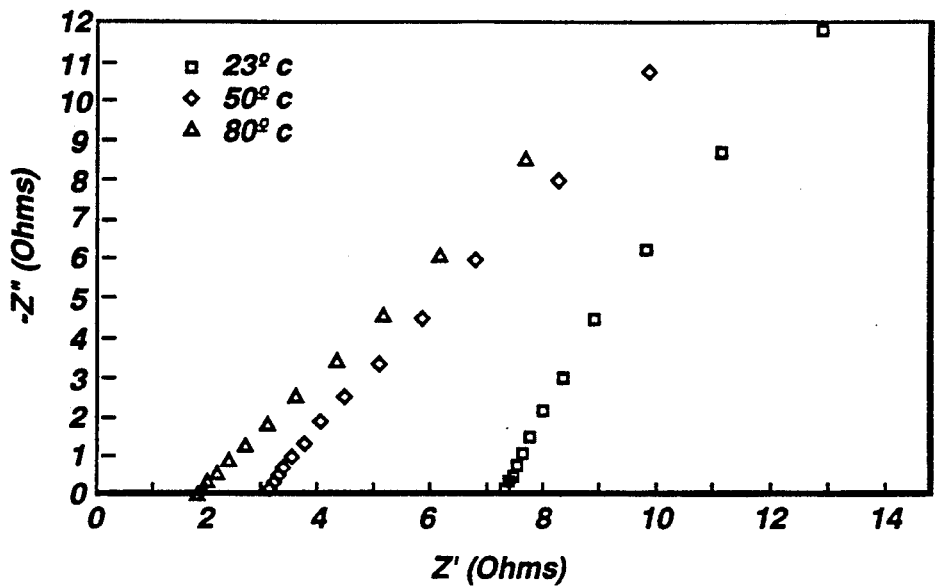
Figure 6B:
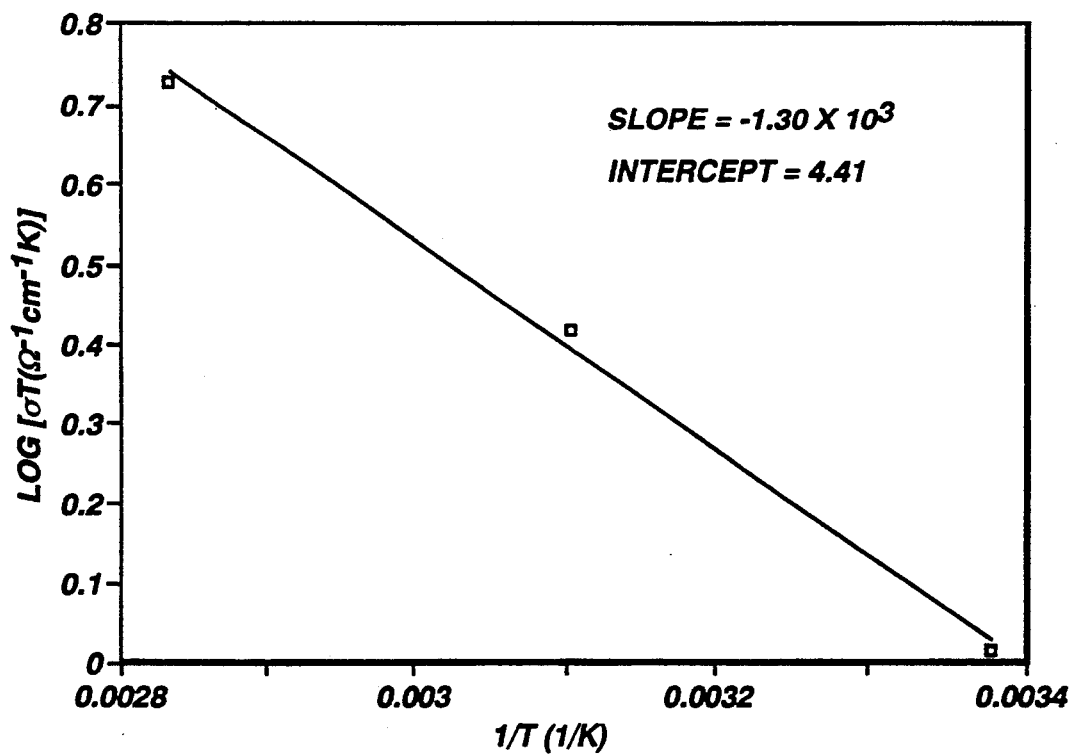
Figure 7A:
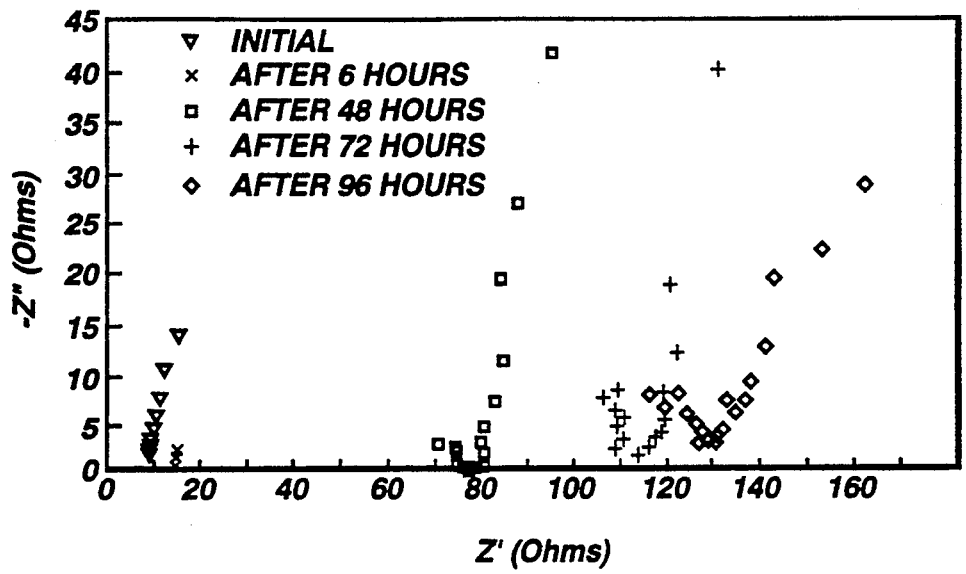
Figure 7B:
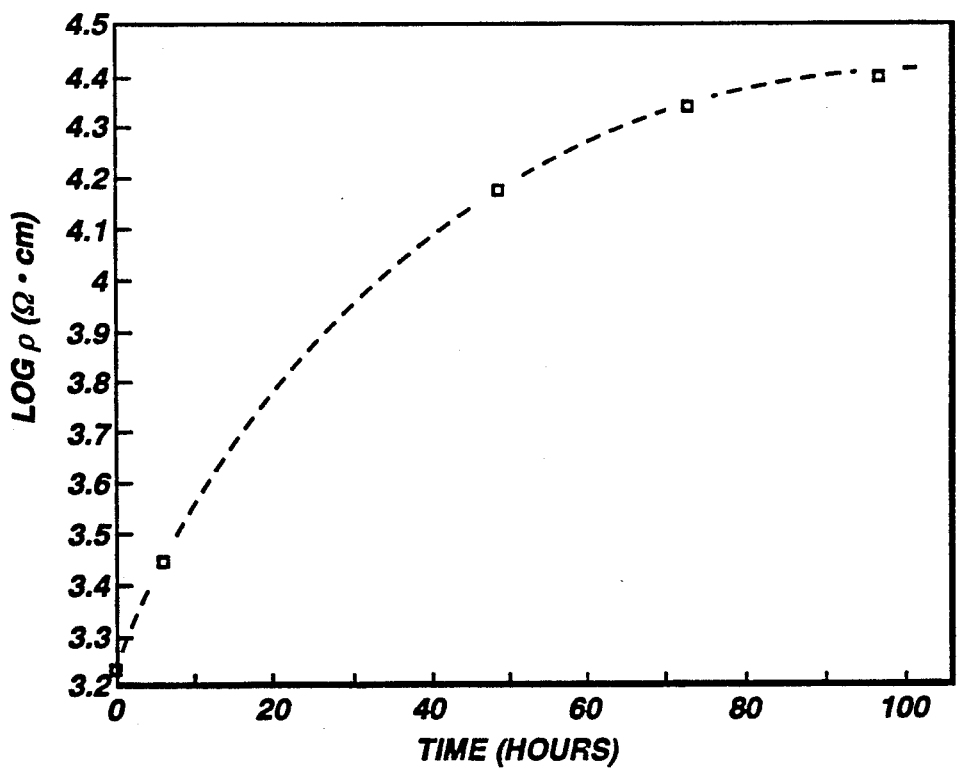
Figure 8:
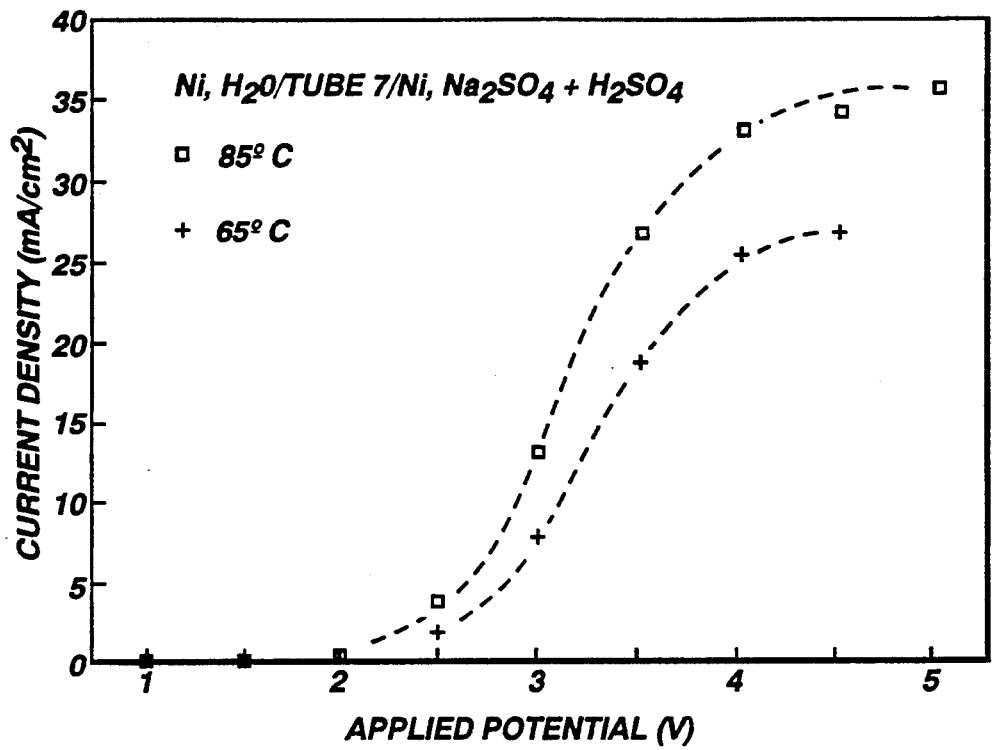
Figure 9:
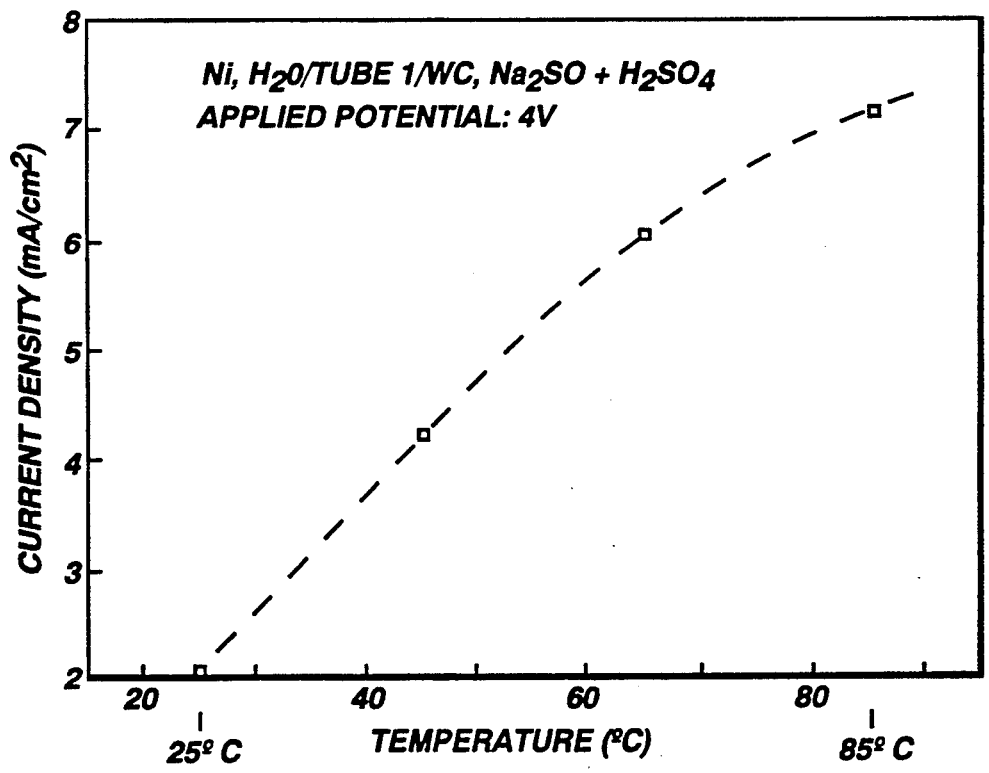
Figure 10:
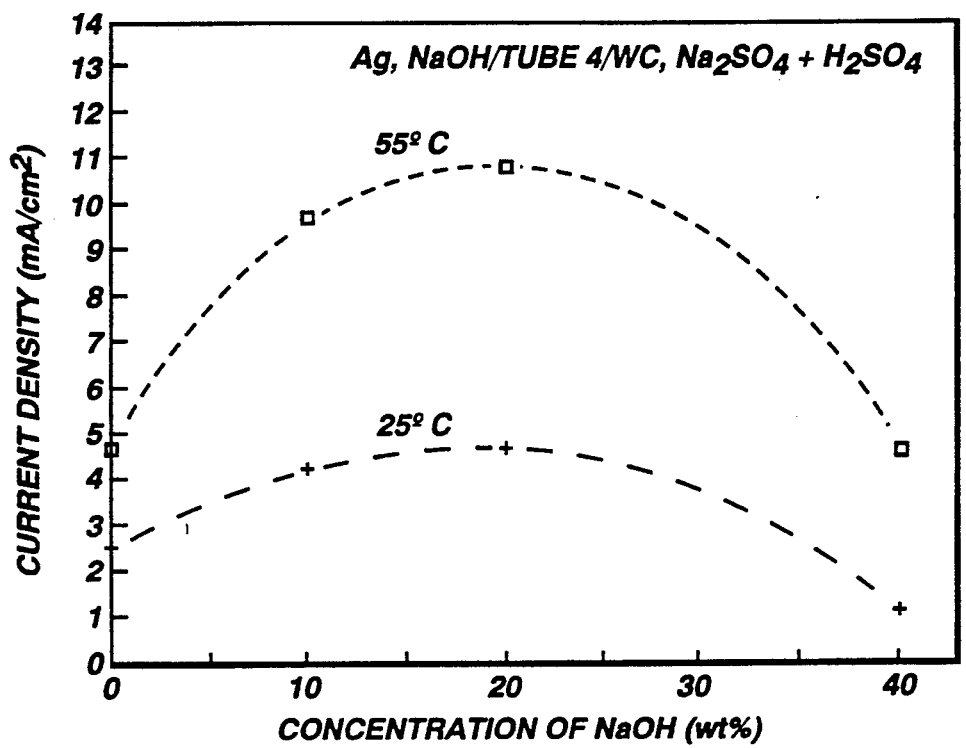
Figure 11:
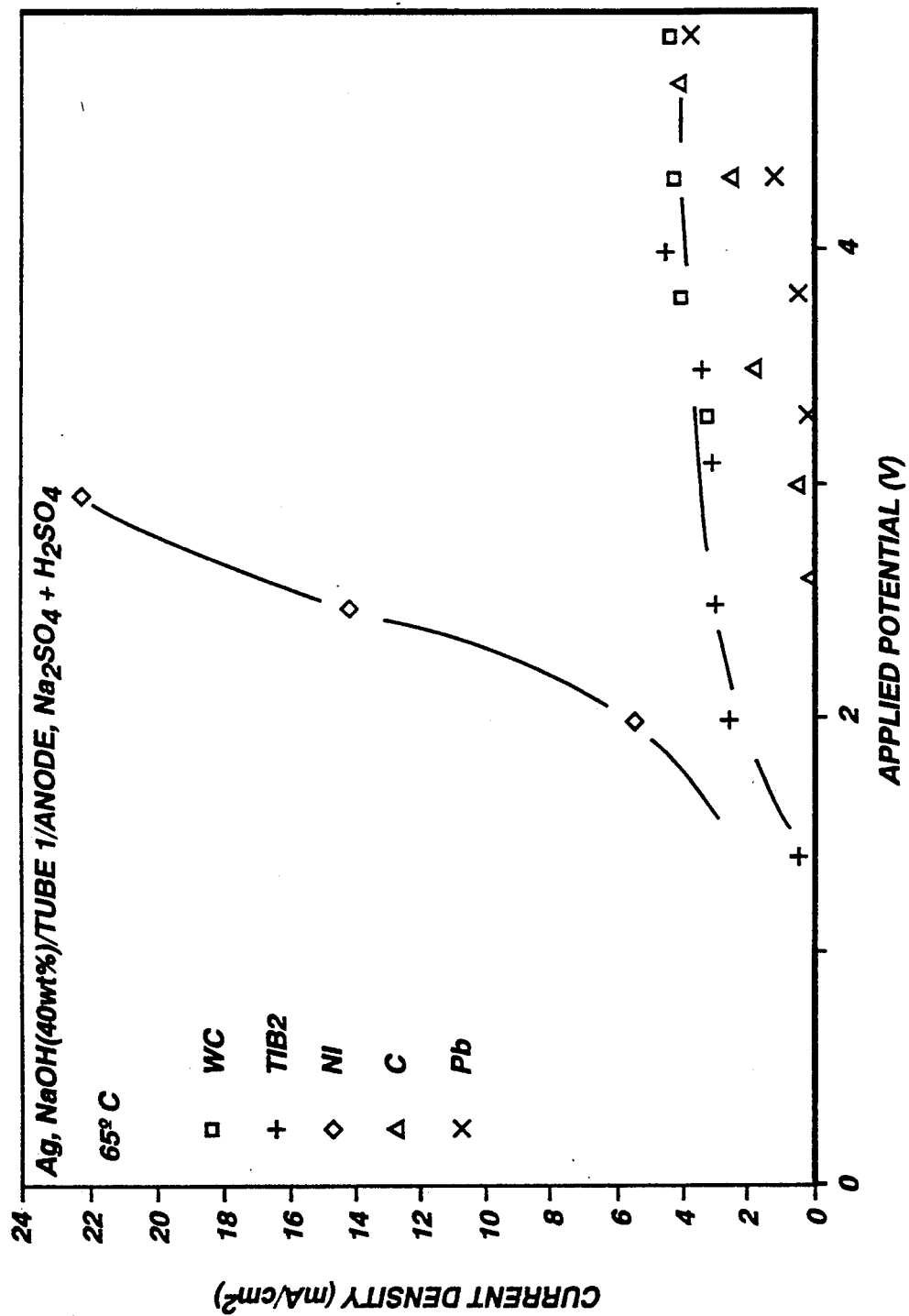
Figure 12:
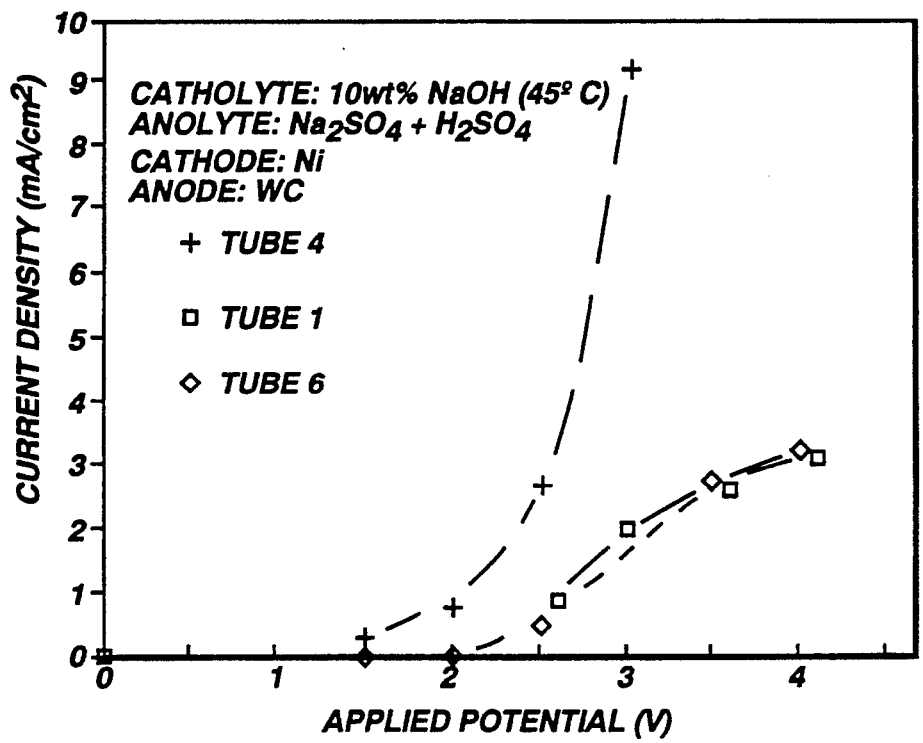
Figure 13:
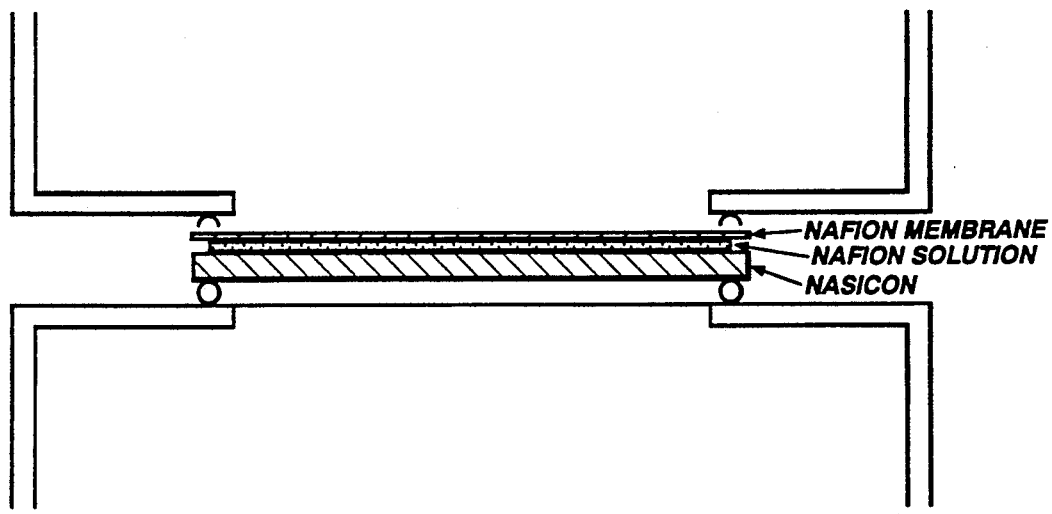
Figure 14:
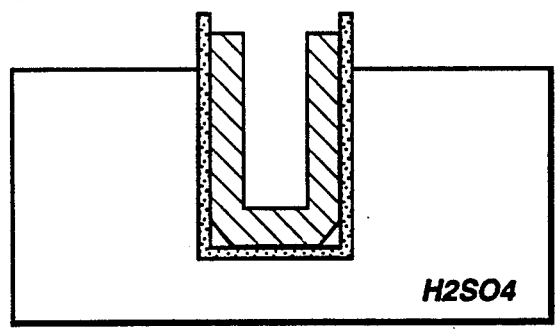
Figure 15:
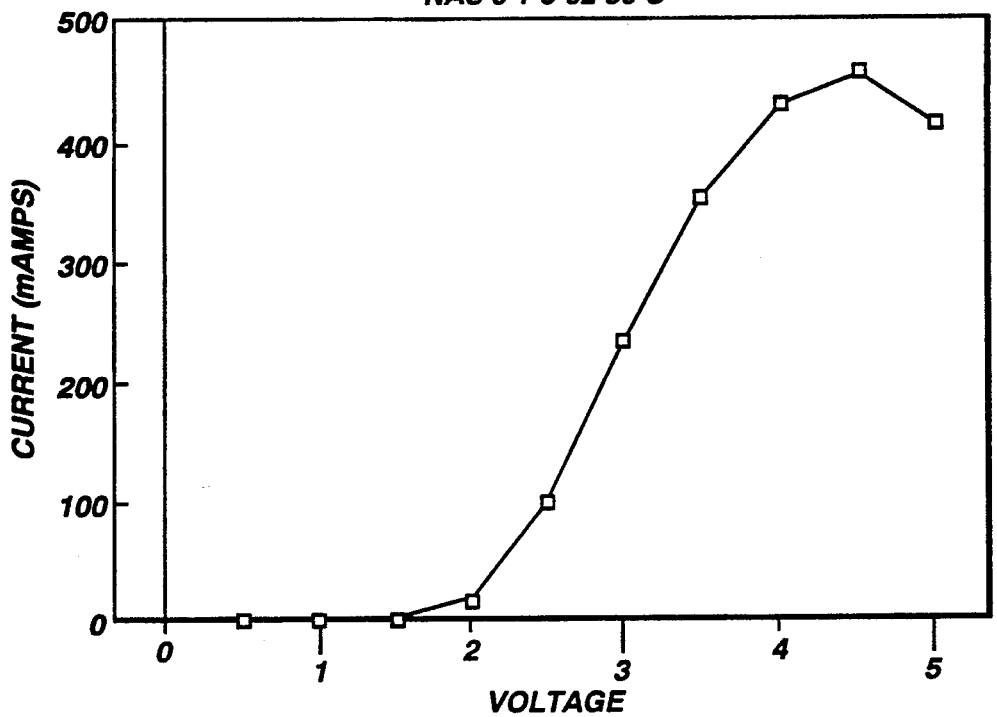
Figure 16:
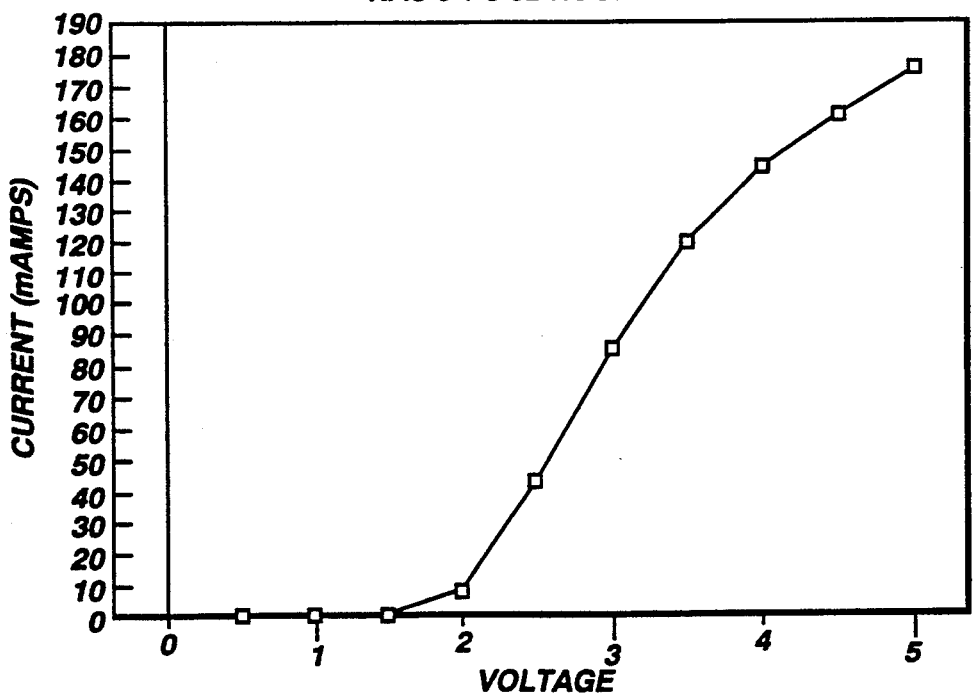
Figure 17:
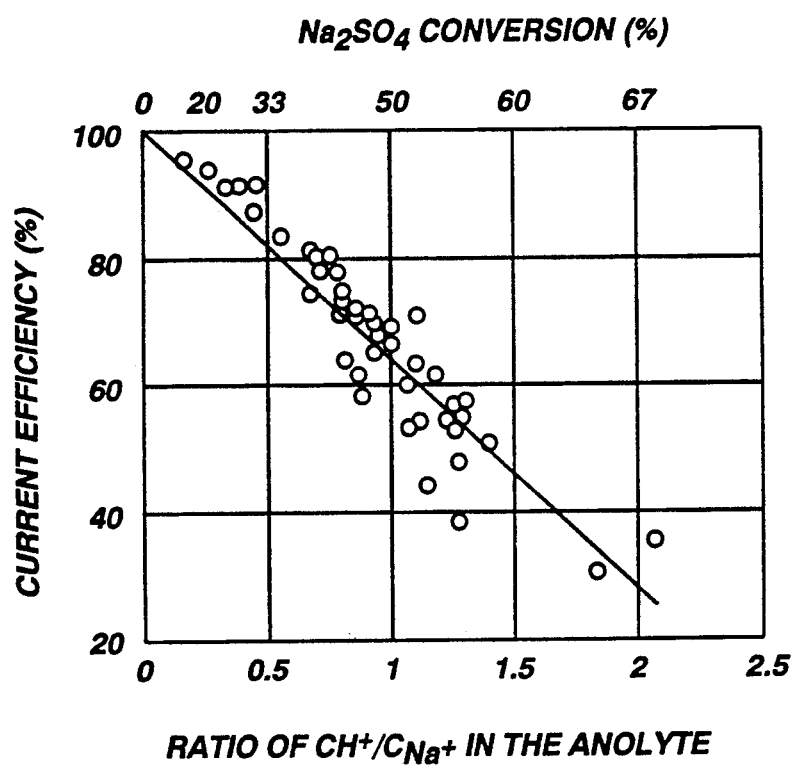
Figure 18:
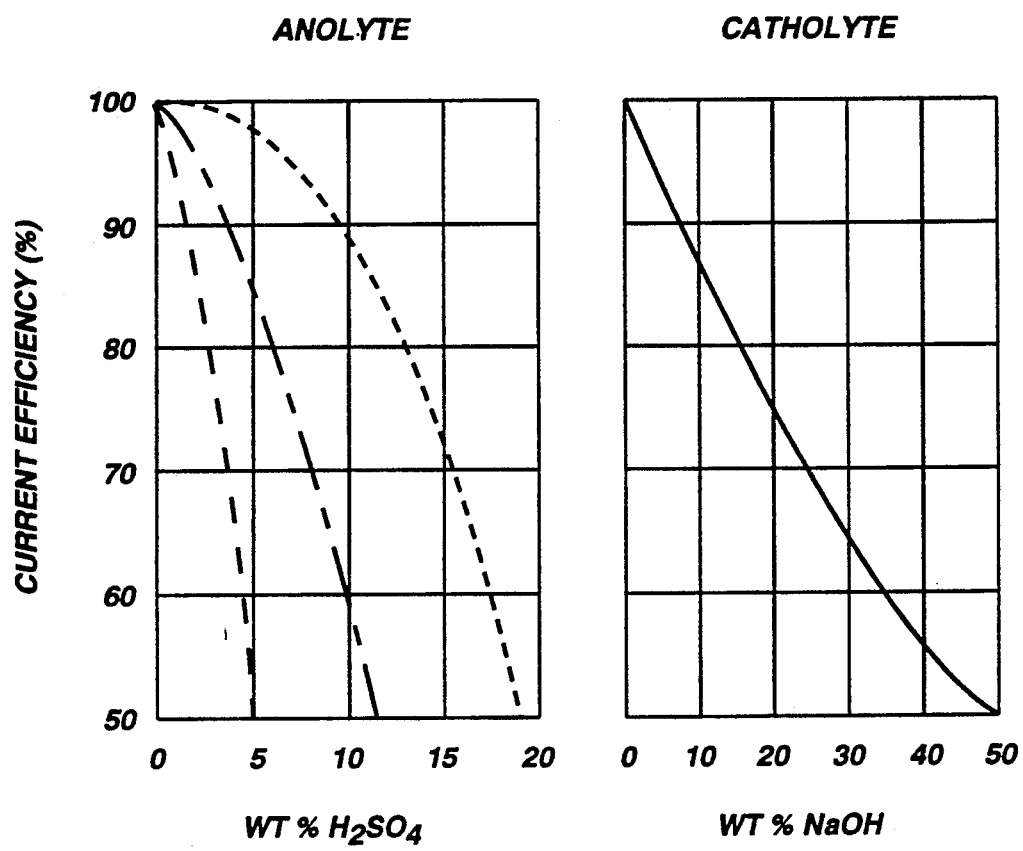

Shown in FIG. 4 are preliminary results based on a laboratory cell for NaOH production of the ceramic membrane;

FIG. 5 is a schematic representation of an electrodialysis cell employing sodium ion-conducting membranes alternating with proton-conducting membranes;

FIG. 6(a) is a graph illustrating initial impedance spectra for a typical NASICON tube;

FIG. 6(b) is a graph illustrating initial ionic conductivity of the NASICON tube as a function of temperature;

FIG. 7(a) is a graph illustrating the impedance evolution of a NASICON tubular cell;

FIG. 7(b) is a plot of the tube resistivity determined from the spectra of FIG. 7(a);

FIG. 8 is a graph illustrating typical I-V characteristics of a tubular cell at two testing temperatures;

FIG. 9 is a plot of cell performance as a function of increasing cell temperature;

FIG. 10 is a plot of cell performance as a function of NaOH concentration in the catholyte;

FIG. 11 is a plot illustrating the effectiveness of certain electrode materials;

FIG. 12 is a graph illustrating the characteristics of several electrolytic cells having NASICON tubes of differing conductivity;

FIG. 13 is a schematic illustrating a composite ceramic-polymer electrolyte;

FIG. 14 is a schematic illustrating a polymerwrapped ceramic tube electrolyte;

FIG. 15 is a graph illustrating cell performance using sodium chlorate at an operating temperature of 50° C.;

FIG. 16 is a graph illustrating cell performance using sodium chlorate while operated at room temperature;

FIG. 17 is a graph illustrating the effect of salt to acid conversion on current efficiency of polymeric membranes; and FIG. 18 is a graph illustrating the effect of NaOH and acid concentrations on current efficiency of polymeric membranes.

DETAILED DESCRIPTION OF INVENTION

Figure 1:
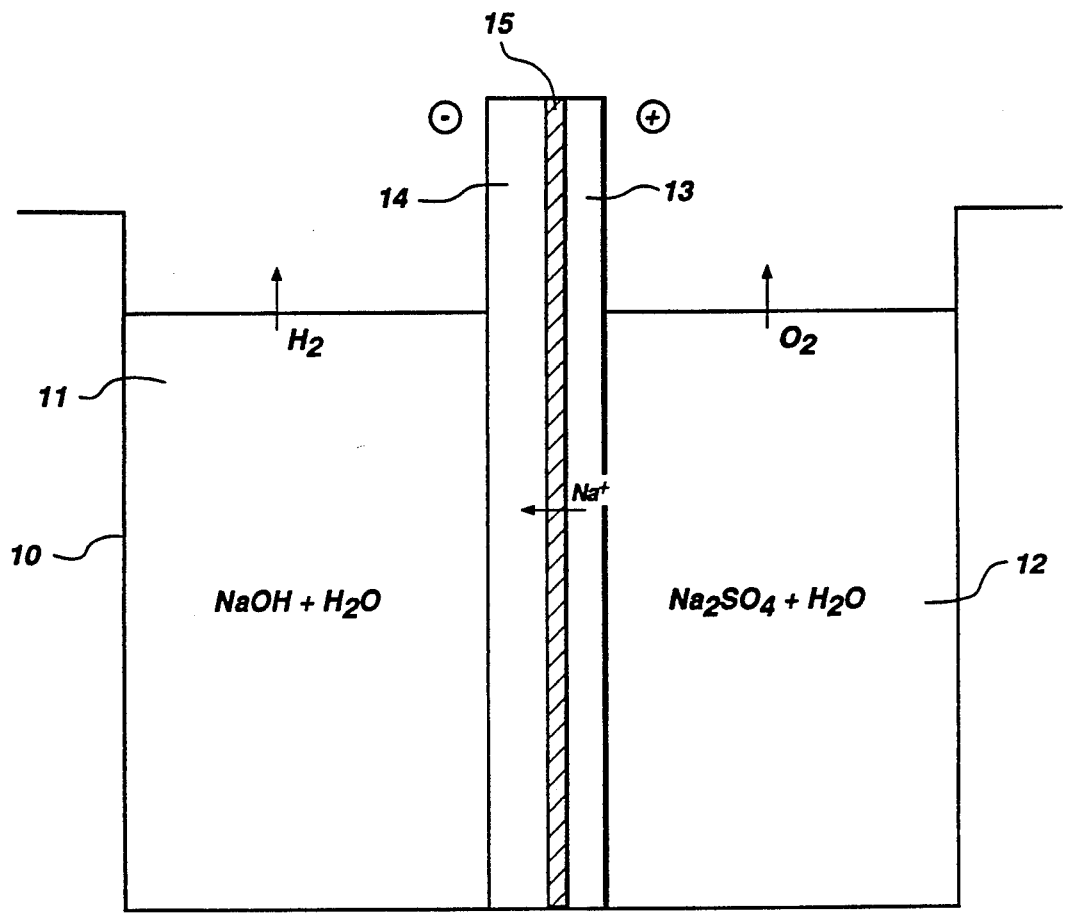
FIG. 1 is a schematic representation of a caustic electrolytic cell having a unitary (monolithic) ceramic membrane.

Detailed description of the instant invention may be facilitated by reference to FIG. 1 which is a schematic of a cell having a corrosion resistant container 10, a catholyte chamber 11, an anolyte chamber 12, an anode 13, a cathode 14 and a ceramic sodium ion-conducting electrolyte 15. In the cell of FIG. 1, the ceramic membrane is a very thin unitary ceramic such as NASICON ($Na_{1+z}Zr_2P_3-xSi_xO_{12}$), where x is $0 < x < 3$ which is structurally supported by the cathode and the anode, each of which is porous.

While a thin ceramic ion-conductive membrane is very effective and efficient, it is not necessary for either the cathode or anode to contact the electrolyte. Both the catholyte and anolyte are ion-conductive so that from an electrical standpoint the electrodes may be remote from the sodium ion-conductive membrane. In such an event, a thinfilm dense ceramic membrane may be deposited on a porous substrate, which does not have to be an electrode.

A sodium salt, such as an aqueous solution of sodium sulfate, is charged into the anolyte chamber. A very dilute solution of caustic is charged into the catholyte chamber. It is desirable to start with an electrolyte solution of some sort in the catholyte chamber since pure water is not a very good electrolyte.

An example of an overall electrolytic reaction, using sodium sulfate, is as follows:

$$Na_2SO_4 + 3H_2O \rightarrow 2NaOH + H_2SO_4 + \tfrac{1}{2}O_2 + H_2 \quad \text{Equation (1)}$$

The half-cell reactions may be summarized as follows:

(anode) $Na_2SO_4 + H_2O \rightarrow Na^{++}H_2SO_4 + 2e + \tfrac{1}{2}O_2 \rightarrow$  Equation (2)
(cathode) $2Na^+ + 2H_2O + 2e \rightarrow 2NaOH + H_2 \rightarrow$  Equation (3):

The above-identified reactions are electrolytic reactions, i.e. those which take place under an induced current wherein electrons are introduced or are removed to cause the reactions. The reactions proceed only so long as a current is applied to the cell.

In contrast to the electrolytic reactions occurring in electrolysis cells, galvanic reactions may occur when an applied potential to the cell is removed, which tends to reduce the efficiency of the electrolysis cell. Galvanic reactions are the source of electricity produced by storage batteries.

The overall galvanic reaction for the cell is as follows:

$$2NaOH + H_2SO_4 \rightarrow \tfrac{1}{2}O_2 + Na_2SO_4 + H_2O$$

The galvanic reaction is the reverse of the preferred electrolytic reaction.

It is preferred that only electrolytic reactions occur in the cell and that galvanic reactions be eliminated or, at least, greatly minimized.

Electrolytic membranes preferred in the instant invention are those which eliminate or minimize galvanic reactions and promote only electrolytic reactions and have the following characteristics:

(1) High ionic conductivity with minimum, preferably negligible, electronic conductivity;
(2) High selectivity to preferred ionic species;
(3) Physical separation (low porosity of electrolyte) of the anolyte from the catholyte.

One of the significant advantages of the instant invention is that ceramic electrolytes, especially NASICON, are impermeable to both the catholyte and anolyte solution. A distinct advantage of ceramic electrolytes, such as NASICON, is their low (negligible) electronic conductivity, virtually eliminating any galvanic reactions from occurring when an applied potential or current is removed. Ceramic membranes typically are very selective to a specific ion and hence have a high transference number of preferred species, implying very low efficiency loss due to electrodialysis or dialysis. Polymeric membranes generally have low transference number of preferred species and, therefore, have low current efficiency due to electrodialysis. As illustrated by FIG. 17, at a one-to-one ratio of protons to ions, a salt to acid conversion rate of 50%, the current efficiency of a pure Nafion ® (polymeric) membrane is about 60%. Under similar conditions, the current efficiency of ceramic membranes are about 94% or greater.

Ceramic membranes useful in the instant invention are those which have very mobile sodium ions (high ionic conductivity), low electronic conductivity and corrosion resistance. Exemplary ceramic membranes include NASICON, sodium phosphotungstate and soda glasses having high ionic conductivity. Similar glasses of this type have been disclosed by Dow Chemical Co. for use in sodium-sulfur batteries. Such glasses, however, must be resistant to leaching by either strong bases or strong acids.

Figure 2:
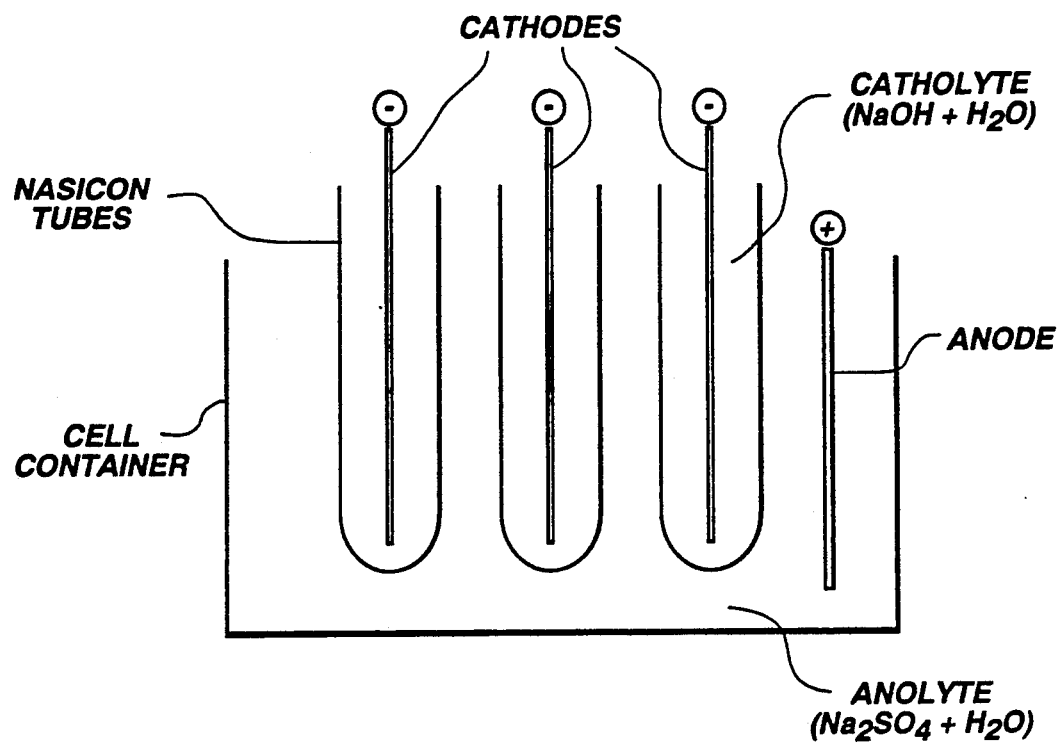
FIG. 2 is a schematic representation of a causticproducing electrolytic cell employing tubular ceramic electrolytes.

A preferred membrane is NASICON since it fulfills all the requirements for a good membrane. Membranes of NASICON may be formed by conventional ceramic processing Such membranes may be in the form of very thin sheets (tape cast) supported by porous ceramic plates, e.g., porous NASICON or alpha alumina, or by porous electrodes, or in the form of thicker sheets (plates) or tubes. A cell employing NASICON tubes is illustrated in FIG. 2 wherein concentrated caustic is formed inside the tubes. In FIG. 2, the anolyte and catholyte chambers may be reversed.

Figure 3:
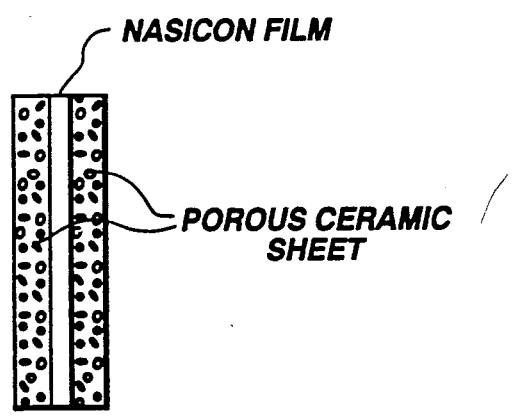
FIG. 3 is an elevational view of a thin-film ceramic electrolyte sandwiched between two porous support members.

From an energy efficiency standpoint, very thin ceramic membranes are preferred. These have the smallest ohmic resistance and energy loss. Thin sheets of NASICON, for example, may be formed by tape casting. Sheets as thin as about 25 micrometers to 0.5 mm are readily producible. Such thin sheets are preferably supported on or between porous structural supports Such structural supports may be the electrodes (see FIG. 1) or porous ceramic sheets or plates (see FIG. 3). The porosity of such ceramic supports is preferably quite high so that the liquid solutions on either side of the supports may be in intimate contact with a large area of the electrolyte membrane. Porosity, as a percent of total volume for electrolyte supports, ranges from about 30 to about 90% porosity.

Ceramic electrolytes, e.g., NASICON, may be vapor deposited (sputtered or plasma sprayed) onto a porous substrate to form membranes which are very thin, e.g. about 5μ or even thinner. The porous substrate must have similar thermal expansion and good bonding with the membrane as well as good mechanical strength. If electrode materials are utilized as structural supports, then similar characteristics for these must be present.

Layered ceramic-polymer composite membranes are also particularly suitable for use as electrolytes in the present invention. Layered ceramic-composite membranes generally comprise ionic-selective polymers layered on a ceramic electrolytic membrane, such as NASICON or beta-alumina. Polymer materials have the disadvantage of having poor selectively to sodium ions resulting in low current efficiency and low salt to caustic conversion, yet they demonstrate high chemical stability. Therefore, composites of sodium selective ceramics with chemically stable polymer layers are very suitable for use in the electrolytic cell of the invention.

The types of polymer material which may be used in the layered ceramic-composite structure include Nafion ® and polyvinyl chloride (PVC). Polymers used in the composite membrane are those which have high chemical stability, high ionic conductivity, good adhesion to ceramic materials and are insensitive to impurity contamination. Such polymers may suitably be polyelectrolyte perfluorinated sulfonic or carboxylic acid polymers, matrix-based polymers, co-polymers or block-polymers.

The electrode materials must be good conductors and must be stable in the media to which they are exposed. A particularly suitable electrode material is DSA dimensionally stable anode) which is comprised of ruthenium oxide coated titanium ($RuO_2.Ti$). Good anodes can also be formed from nickel, cobalt, nickel tungstate, nickel titanate and the like or from noble metals. Lead, graphite, tungsten carbide and titanium diboride are also useful anode materials. Good cathodes can be formed from metals such as nickel, cobalt, platinum, silver and the like and alloys such as titanium carbide with small amounts (up to about 3%) of nickel, $FeAl_3$, $NiAl_3$ and the like. Graphite is also a good cathode material.

The electrochemical cells of the instant invention may be operated batchwise or continuously. Continuous operation of a cell involves continuous introduction of water to the catholyte and removal of concentrated aqueous caustic solution while a feed salt solution is introduced to the anolyte concurrent with removal of concentrated sulfuric acid containing some salt. As with any chemical reaction, removal of the reaction products assists the reaction proceeding in the desired direction. However, if dilute (unconcentrated) caustic solution is removed from a cell, then expensive energy is consumed in evaporating the caustic solution to achieve concentrated caustic solution or crystalline NaOH. Thus, some balancing must be done to select the proper concentration of caustic and sulfuric acid to be removed from the cell of the instant invention.

Batchwise operation involves charging the cell with a feed salt solution as the anolyte, dilute caustic solution as the catholyte and operating the cell at the desired temperature and voltage until a concentrated aqueous caustic solution is obtained.

Cells of the instant invention employing NASICON membranes may be operated in caustic solutions of 50% by weight concentration and in sulfuric acid up to four molar (approximately 40% by weight) concentration.

EXAMPLE I

An electrochemical (electrolysis) cell containing a sodium ion conducting ceramic membrane was constructed of a caustic/acidic resistant container of polypropylene (PP) material. The cell has a configuration as illustrated in FIG. 1 wherein a thin, approximately 2 mm in thickness, impervious NASICON ceramic membrane with an area of about 8 to 9 $cm^2$ was sandwiched between a porous tungsten carbide anode and a porous silver cathode. The sandwich type structure was used primarily to provide structural support to the NASICON membrane since the electrodes also operate effectively when remote from the membrane.

The porous silver cathode has a porosity of about $-50\%$ by volume and a thickness of about $-0.5 \sim 1.0$ mm. The porous tungsten carbide (WC) anode had a porosity of about $30 \sim 50\%$ by volume and a thickness of about $0.5 \sim 2.0$ mm. Both electrodes were deposited on a NASICON tube with wall thickness of 1.5 mm and diameter of ⅜ inch.

The membrane was sealed in the PP container to separate the container into an anolyte compartment and a catholyte compartment. A concentrated solution of sodium sulfate was placed in the anolyte compartment while a very dilute solution of caustic (NaOH) was placed in the catholyte compartment.

A voltage of 3 volts was applied while operating the cell at a temperature of 80° C. A current density of about 50 $mA/cm^2$ was observed. As the cell operation was continued, the pH of the respective electrolyte compartments was monitored. The pH of the catholyte increased, indicating the continual production of NaOH while the anolyte pH decreased, indicating the production of sulfuric acid.

The operation of the cell was further conducted at various temperatures and voltages. The resulting currents from such operation are indicated in FIG. 4. As evidenced from the data represented in FIG. 4, the current density increased disproportional to increases in temperature, i.e. a voltage increase of three volts resulted in a current increase from about 150 mA to over 400 mA. The current density at 3 volts and 80° C. was about 50 $mA/cm^2$ while at 2 volts and 80° C. the current density was less than 10 $mA/cm^2$, indicating a large increase in current density due to increases in voltage This indicates that the electrode kinetics at the interfaces between the electrodes and the solution contribute significantly to total cell impedance. Therefore, better electrode materials can dramatically enhance cell performance.

The cell temperature was maintained at a maximum of 80° C. since the boiling point of water is 100° C., and it is generally desired to operate below the boiling point of the aqueous anolyte and catholyte. Operation at even higher temperatures is desirable from an energy standpoint although corrosion and other problems may exacerbate such operation. Operation at temperatures greater than 100° C. requires superatmospheric pressures. Achieving higher current densities through a higher operating temperature is only partially successful inasmuch as gases are released during the electrochemical reactions proceeding within the cell. Increased pressure in the anolyte and cathode chambers subdues the reaction proceeding in the desired direction when gas is a reaction product. However, the retardation of the reaction by increase in pressure may be more than offset by the increases in the electrical efficiencies from increased conductivity of the electrolytes and the ion conducting membrane.

EXAMPLE II

Electrolysis Cells

For simplicity purposes, tubular electrochemical cells were used in this study. NASICON ceramic tubes were employed as sodium ion conductive membranes. The densities of those tubes typically ranged from 91% to 97% of theoretical density The outside diameter of the tubes was about 10 mm whereas the wall thickness was in the range of 0.9 to 1.5 mm. The length of the tubes was between 40 and 65 mm.

(1) Cathode materials.

Cathode materials used in this example were nickel and silver metals. Porous silver electrode was applied by brushing a silver slurry on a NASICON tube and subsequent firing at 750° C. for 2 hours. Nickel electrode was in a mesh form which was usually wrapped around a NASICON tube. Unless otherwise stated, nickel mesh was used as the standard cathode throughout this example since early observations indicated that nickel mesh delivered higher current densities than porous silver.

(2) Anode materials.

Anode materials used in this example include silver, nickel, lead, graphite, WC and TiB. The selection of anode is based on the catalytic activity and chemical stability of the materials in the severe oxidizing environment. Among these anodes, Ni and Ag were used in mesh forms, WC and $TiB_2$ were cylinders, and graphite and lead were solid rods.

(3) Cell construction.

A NASICON ceramic tube was suspended in a plastic chamber containing NaOH solution. (The arrangement was similar to FIG. 3, except that only a single NASICON tube was employed.) An aqueous solution saturated with $Na_2SO_4$ was poured in the tube. In order to evaluate the strength of products obtainable from this process, the concentrations of NaOH in the cathodic solution was varied from 0 to 40% by weight whereas the concentration of $H_2SO_4$ in the anodic solution was fixed at about 30 wt%.

ELECTROCHEMICAL CHARACTERIZATION

Applied potential

A potentiostat was used to apply a steady voltage to the electrolytic cell. The voltage was varied from 1 to 5 volts to determine the effect of applied voltage on operating current densities.

Operating temperature

Electrolytic cells were immersed in a constant temperature circulating bath (Haak, Model F3) to control cell temperature with fluctuation of ±0.2° C. The operating temperature was varied between 35° and 85° C.

Initial ionic conductivity

Typical impedance spectra of as-prepared NASICON materials are shown in FIG. 6(a). The initial ionic conductivity of the NASICON tubes, determined from the spectra, is plotted as a function of operating temperature in FIG. 6(b).

It was observed that materials obtained from three batches showed different conductivities, indicating that the electrical properties of these materials depend critically on processing.

Ionic conductivity during cell operation

Impedance of electrolytic cells was periodically monitored during cell operation. A number of cells have been continuously operated for over 100 hours. It was observed that the conductance of the cell changed during operation. The impedance evolution of the cell is shown in FIG. 7(a). The resistivity of the electrolyte determined from the spectra shown in FIG. 7(b) as a function of operating time. It was this deterioration in electrolyte resistance which brought an inconsistency in electrochemical characterization; the observed current densities at a given applied potential decay during operation. Fortunately, the deterioration rate in resistance attenuated gradually and after about 80 hours operation, the cell performance became relatively stable. Accordingly, the following results on cell performance appear to represent the steady-state performance after 80 hours of operation.

The increase in electrolyte resistivity may be due to either impurity blocking or electrochemical degradation of the material. Impurity blocking has been observed in beta-alumina, a sodium ion conductor having much less water resistance than NASICON. For instance, divalent cations such as $Ca^{++}$ may diffuse into the conduction plane of beta"-alumina and block the transport of $Na^+$ in the material. Such a problem if occurring with NASICON, can be avoided either by eliminating undesirable impurities in the electrolytic bath or by frequent reversing of the polarity of the applied potential to condition the material.

Performance of electrochemical cells

The tubular electrolytic cells were constructed and tested. The pH of the solutions in both sides of the cell were continuously monitored. As electrolysis proceeds, the solution in the cathodic compartment becomes more basic (pH increases), indicating the formation of NaOH, whereas the solution in the anodic compartment becomes more acidic (pH decreases), indicating the formation of $H_2SO_4$.

I-V characteristics

The performance of electrochemical cells was typically evaluated in terms of the current density as a function of applied potential. FIG. 8 shows some typical I-V characteristics of a cell at two testing temperatures. Clearly, when the applied voltage is close to the EMF of the cell, the observed current density was very small. When the applied potential is sufficiently high, the current density reaches a plateau, indicating that the overall process is limited by mass transport. The minimum potential at which the current plateau occurs will set the maximum operating potential for a given system. The limiting current can be expressed as $$j_1 = (nFA)D_i \frac{c_i}{\delta}$$

where n is the number of electrons involved in the electrode reaction, F is Faraday constant, A is the active surface area of the electrode, $D_i$ is the diffusion coefficient of the electroactive species i, $c_i$ is the concentration of species i in the bulk solution, and $\delta$ is the Nernst-diffusion layer thickness.

Accordingly, the limiting current densities in a practical electrolytic bath, where the electrolyte solution is flowing through, should be higher than the current densities obtainable in the tubular experimental cell, where solution is stationary.

Effect of operating temperature

Since both the charge transfer and mass transfer are the thermally activated processes, cell performance improves with the increase of operating temperature, as illustrated in FIG. 9.

Effect of electrolyte concentration

The effect of NaOH concentration in the cathodic solution on cell performance is illustrated in FIG. 10. Current densities initially increase with NaOH concentration, reach a maximum at about 20 wt% of NaOH, and then decline gradually with the increase in NaOH concentration. This phenomenon is probably related to the proton reduction and hydrogen evolution occurring at the electrolyte-cathode interface.

Effect of electrode materials

Among the six electrode materials evaluated in this example, nickel mesh showed the highest catalytic activity for oxygen evolution in sulfuric acid medium (see FIG. 11). All the ceramic electrodes exhibited very similar behavior which was characterized by little dependence of current density on the applied potential when $V_a$ is above a certain value. The chemical stability of ceramic electrodes such as WC and $TiB_2$ is superior to that of metal electrodes However, Ni is not stable in $H_2SO_4$. Accordingly, DSA has been used as an anode.

Effect of resistance of ceramic membrane

It was also observed that the resistance of ceramic membrane plays an important role in the electrochemical process. FIG. 2 shows the I-V characteristics of several electrolytic cells with NASICON tubes having different conductivity The cell with NASICON electrolyte having conductivity in the order of $10^{-3}\ \Omega^{-1}\ cm^{-1}$ showed exponential-like dependence of current on applied potential, indicating the overall process was controlled by electrode kinetics On the other hand, cells with resistive NASICON electrolytes (in the order of $10^{-4}\ \Omega^{-1}\ cm^{-1}$) showed linear dependence of current density on the applied potential. Accordingly, cell performance may be greatly enhanced through improved electrolyte conductivity

Production rate

Initially, when the NASICON tube was fresh, current density of more than 50 mA/cm$^2$ was observed at 80° C. and an applied potential of 3 volts (the thickness of the tube was about 1.5 mm). Unfortunately, the resistance of the NASICON tube increased during operation, leading to decay of current density The steady-state current density was about 36 mA/cm$^2$ at 8° C. and 28 mA/cm$^2$ at 65° C. (FIG. 8) after about 80 hours of operation (the conductance of the electrolyte was decreased about one order of magnitude).

The conductance of the electrolyte may be improved an order of magnitude by reducing the thickness of the electrolyte from 1.5 mm to 0.15 mm via tape casting techniques, resulting in an optimized current density in the order of 500 mA/cm$^2$ at 85° C. At this operating current density, the production rate of NaOH, $H_2SO_4$, $H_2$, and $O_2$ would be 18, 21.9, 0.45 and 3.58 grams per cm$^2$ per day, respectively.

Current efficiency

Current efficiency is primarily determined by the properties of the membrane materials, including selectivity to Na$^+$, electronic conductivity, as well as permeability to other ionic species. For the production of NaOH based on a solid-state electrolyte membrane, the current efficiency increased with the ionic transport number for sodium ions in the membrane. NASICON membrane has demonstrated higher selectivity to Na$_+$ than any polymeric cation selective membranes. The current efficiency for the process based on NASICON membranes is about 94% at a 50% salt to acid conversion ratio, much greater than that for an analogous process based on a polymeric membrane such as Nafion ® membranes about which has an efficiency of 60%. A higher current efficiency results in a lower energy loss due to undesirable electrochemical reactions.

Energy efficiency for the process will be the product of current efficiency and voltage efficiency.

The production rate for cells of the instant invention are capable of yielding 40 kg NaOH, 49 kg $H_2SO_4$, 1 kg or 11.2 standard cubic meters of hydrogen and 8 kg or 5.6 cubic meters of oxygen from 72 KW hours.

A ceramic membrane, such as NASICON, which has been contacted with a chemically stable polymer may be used as the electrolyte in the electrochemical cell in accordance with the invention. Polymers which are particularly suitable are those which exhibit high ionic conductivity, good adhesion to the ceramic membrane and insensitivity to contamination from impurities in the feeding solutions. Examples of such polymers are Nafion ® and polyvinyl chloride (PVC). Nafion ® is a polymer having the following chemical structure

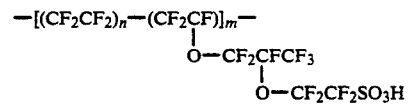

where "n" denotes a possibility of more than one $CF_2CF_2$ sequence, and where "m" indicates a longer polymer chain. Polymer material may be contacted to the ceramic membrane in several different ways, including the following examples:

EXAMPLE III

Protective sheet contacted to ceramic

A Nafion ® sheet was cut to the size of a NASICON disk and immersed in 3 M $H_2SO_4$ solution for one hour, allowing the Nafion ® to swell with the solution. After rinsing it with water, the swollen sheet was laminated onto one side of the NASICON disk which had been precoated with Nafion ® Solution (duPont Company; stock No. 27.470-4 from the 1990-91 Aldrich Catalog: contains 5% Nafion ® dissolved in an ethanol-water mixed solvent, where the equivalent weight of Nafion ® is about 1100.) The Nafion ® solution acts as a glue to bind the Nafion ® sheet to the NASICON disk. The laminated disk is illustrated in FIG. 13.

The disk was used as an electrolytic membrane in a cell where DSA (Permascand, Sweden) was used as the anode immersed in a solution containing 10% $H_2SO_4$ and 10% $Na_2SO_4$ and nickel mesh was used as the cathode immersed in a 10% NaOH solution. The polymer-coated side of the membrane was oriented in the cell toward the anodic compartment and the side without the polymer was oriented toward the cathodic compartment. The cell was operated at 60° C. under a constant applied potential of 4.0 volts. Titration analysis of the anodic and cathodic compartments contents indicate that sodium sulfate was electrolyzed with a 94% current efficiency. No apparent degradation was observed in the NASICON disk although some cracks appeared.

Polymer wrapped ceramic tube

A sheet of Nafion ® was cut to fit around the exterior surface of a tube of NASICON. The exterior surface of the NASICON was coated with Nafion ® solution and the sheet was wrapped about the tube. The Nafion ®-wrapped tube was dried at 120° C. for three hours. A schematic representation of the tube is shown in FIG. 4. The prepared tube was used as the electrolyte of a cell where DSA was used as the anode and nickel mesh was used as the cathode. The cell was operated at 60° C. and at 4.0 volts for 120 hours. The tube appeared to have a number of cracks, suggesting a break in the seal between the sheet and membrane. Although the cell worked efficiently in the beginning, the Nafion ® sheet eventually delaminated from the Nasicon membrane. However, the weight loss of the ceramic tube during the testing was very small indicating the ceramic was chemically protected by the polymer.

Polymer film coating

Clean-fired NASICON tubes were preheated to 70° C. and were then dipped in a Nafion ® solution. In order to achieve a dense coating having no pin holes, the tubes were dipped four times. Evaluation through scanning electron microscopy indicated a smooth film with no pin holes was achieved with four coatings which produced a thickness of about eight microns. The tubes were then dried at a temperature of from about 50° C. to about 70° C. for about one hour and then cured further at about 120° C. to about 150° C. for about 20 minutes. It was observed that the coating maintains greater integrity and mechanical strength with increased curing temperature. Good adhesion of the polymer is important to provide protection to the ceramic membrane Adhesion, it was observed, increases with increase in curing temperature.

A Nafion ® coating may be applied to a Nasicon tube by shrink-wrapping in which a nested sheet of Nafion is placed about a Nasicon tube. As the Nafion ® cools it adheres to the outer surface of the Nasicon tube. A mechanical coherence is established.

A further example of electrolysis of sodium-containing salts involves aqueous sodium chlorate solutions. The reaction is as follows:

$$2NaClO_3 + 3H_2O \uparrow 2NaOH + 2HClO_3 + H_2 \rightarrow + \tfrac{1}{2}O_2 \uparrow$$

The half-cell reactions may be written as follows:

$$2NaClO_3 + H_2O \rightarrow 2Na^+ + 2HC_2 \rightarrow$$

Three electrolytic cells, each comprising a NASICON membrane, an Inconel ™ (78% Ni, 13% Cr, 6% Fe) or other high nickel allow metal anolyte containing 40% NaClO₃ and a nickel mesh catholyte containing 10% NaOH were operated at 50° C. The results of the tests are shown in FIG. 15. The observed cell current was about 450 mA at an applied voltage of 4 volts. When the cells were operated at room temperature, however, as illustrated in FIG. 16, the observed cell current was about 150 mA at an applied voltage of 4 volts.

Further examples of electrolytic reactions to produce caustic using sodium-containing salts include the aqueous solutions of sodium carbonate, sodium nitrate, sodium phosphate, sodium hypochlorite, sodium chlorite, and sodium perchlorate. Aqueous solutions of sodium-containing salts are electrolyzed in a cell as follows:

EXAMPLE IV

An electrolytic cell was used comprising a NASICON tube, nickel mesh as the cathode and a platinum mesh as the anode. The NASICON tube was placed in a plastic chamber containing NaOH solution. An aqueous solution containing about 40% Na₂CO₃ (sodium carbonate) was introduced into the tube. A voltage of 3.0 volts was applied to the electrochemical cell at ambient temperature. It was observed that the concentration of NaOH in the chamber increased, while the concentration of carbonic acid increased within the tube. The following reaction illustrates:

$$Na_2CO_3 + 2H_2O \rightarrow 2NaOH + H_2CO_3 + \tfrac{1}{2}O_2 \rightarrow + H_2 \rightarrow$$

The half cell reaction being:
anode:
$$Na_2CO_3 + H_2O \rightarrow 2Na^+ H_2CO_3 + 2e^- + \tfrac{1}{2}O_2 \rightarrow$$

cathode: $2Na^+ + 2H_2O + 2e^- \rightarrow 2NaOH + H_2 \rightarrow$

EXAMPLE V

An electrolytic cell was used comprising a NASICON tube, nickel mesh as the cathode and a platinum mesh as the anode. The NASICON tube was placed in a plastic chamber containing NaOH solution. An aqueous solution containing about 40% NaNO₃ (sodium nitrate) was introduced into the tube. A voltage of 3.0 volts was applied to the electrochemical cell at ambient temperature. It was observed that the concentration of NaOH in the chamber increased, while the concentration of nitric acid increased within the tube. The following reaction illustrates:

$$NaNO_3 + 1\tfrac{1}{2}H_2O \rightarrow NaOH + HNO_3 + \tfrac{1}{2}O_2 \rightarrow + \tfrac{1}{2}H_2 \rightarrow$$

anode: $NaNO_3 + \tfrac{1}{2}H_2O \rightarrow Na^+ HNO_3 + e^- + \tfrac{1}{2}O_2 \rightarrow$ cathode: $Na^+ H_2O + e^- NaOH + \tfrac{1}{2}H_2 \rightarrow$

EXAMPLE VI

An electrolytic cell was used comprising a NASICON tube, nickel mesh as the cathode and a platinum mesh as the anode. The NASICON tube was placed in a plastic chamber containing NaOH solution. An aqueous solution containing about 40% Na₃PO₄ (sodium phosphate) was introduced into the tube. A voltage of 3.0 volts was applied to the electrochemical cell at ambient temperature. It was observed that the concentration of NaOH in the chamber increased, while the concentration of phosphoric acid increased within the tube. The following equation illustrates:

$$2Na_3PO_4 + 9H_2O \rightarrow 6NaOH + 2H_3PO_4 + {}^{3-}/_2O_2 \rightarrow + 3H_2 \rightarrow$$

anode:
$$2Na_3PO_4 + 3H_2O \rightarrow 6Na^+ + 2H_3PO_4 + 6e^- + {}^{3-}/_2O_2 \rightarrow$$

cathode: $6Na^+ + 6e^- + 6H_2O \rightarrow 6NaOH + 3H_2 \rightarrow$

EXAMPLE VII

An electrolytic cell was used comprising a NASICON tube, nickel mesh as the cathode and a platinum mesh as the anode. The NASICON tube was placed in a plastic chamber containing NaOH solution. An aqueous solution containing about 40% $NaClO_2$ (sodium chlorite) was introduced into the tube. A voltage of 3.0 volts was applied to the electrochemical cell at ambient temperature. It was observed that the concentration of NaOH in the chamber increased, while the concentration of chlorous acid increased within the tube. The following reaction illustrates:

$$2NaClO_2 + 3H_2O \rightarrow 2NaOH + 2HClO_2 + \tfrac{1}{2}O_2 + H_2$$

anode:

cathode: 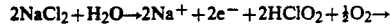

EXAMPLE VIII

An electrolytic cell was used comprising a NASICON tube, platinum mesh as the anode and a nickel mesh as the cathode. The NASICON tube was placed in a plastic chamber containing NaOH solution. An aqueous solution containing about 40% $NaClO_4$ (sodium perchlorate) was introduced into the tube. A voltage of 3.0 volts was applied to the electrochemical cell at ambient temperature. It was observed that the concentration of NaOH in the chamber increased, while the concentration of perchloric acid increased within the tube. The following equation illustrates:

$$2NaClO_4 + 3H_2O \rightarrow 2NaOH + 2HClO_4 + \tfrac{1}{2}\uparrow + H_2\uparrow$$

anode:

cathode: 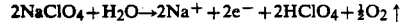

EXAMPLE IX

An electrolytic cell was used comprising a NASICON tube, platinum mesh as the anode and a nickel mesh as the cathode. The NASICON tube was placed in a plastic chamber containing NaOH solution. An aqueous solution containing about 40% NaClO (sodium hypochlorite) was introduced into the tube. A voltage of 3.0 volts was applied to the electrochemical cell at ambient temperature. It was observed that the concentration of NaOH in the chamber increased, while the concentration of HCl increased within the tube. The following equation illustrates:

$$2NaClO + 3H_2O \rightarrow 2NaOH + 2HClO_{30} \tfrac{1}{2}O_2\uparrow + H_2\uparrow$$

anode:
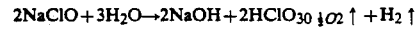

cathode: 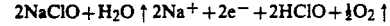

Although cell operation has been described, in particular, as being very effective in producing caustic from sodium sulfate solutions, with the consequent production of hydrogen and oxygen, these unique cells can also produce caustic and chlorine from electrolysis of sodium chloride solution Cells which electrolyze sodium sulfate solution are particularly desirable inasmuch as sodium sulfate is produced through the absorption of $SO_2$ by sodium carbonate solution. The cell may be used to electrolyze sodium nitrate as well, to produce sodium hydroxide, hydrogen and nitric acid.

An effective multiple cell arrangement can be effectively constructed by employing alternate sodium ion conductors and proton conductors. A cell of this type is illustrated in FIG. 5. This particular cell assembly contains a plurality of chambers which are operated in series.

Anode chamber 6 contains anode 17, preferably constructed of $TiB_2$ (titanium diboride) and an anolyte of aqueous $Na_2SO_4$ and $H_2SO_4$. As electrolysis proceeds, $Na_2SO_4$ is converted to $H_2SO_4$. Make-up $Na_2SO_4$ is added to chamber 16 while anolyte containing predominantly $H_2SO_4$ and a small amount of $Na_2SO_4$ is removed. Oxygen is generated at the anode 17 while sodium ions are transported through the sodium ion conducting electrolyte 18 into catholyte-type chamber 19 containing aqueous sodium hydroxide.

In chamber 16 $Na_2SO_4$ is electrolyzed into sodium ions and sulfate ions. The sodium ion is electrolytically transported through the ceramic membrane 18 (preferably dense NASICON) to form sodium hydroxide and a hydrogen ion (proton) which is transported through a proton conducting membrane 20 to form an acid.

Although only chambers 16 and 27 contain electrodes (anode and cathode, respectively), for the purposes of this invention, chambers 16, 21 and 25 are considered anolyte chambers inasmuch electrolysis (disassociation) of $Na_2SO_4$, or other salt, occurs in each such chamber. While in each catholyte chamber sodium hydroxide is formed from the reaction of a sodium ion with water and the release of a proton, the proton in the catholyte chamber is transported through the proton transporting membrane into an adjoining anolyte chamber.

In the assembly of cells illustrated in FIG. 5, positively charged ions (sodium ions and protons) travel from anode-containing chamber 16 through the various cells to result in the release of hydrogen in the cathode-containing chamber 27 at the cathode.

Electrons are provided at the cathode from an external direct current power source. Electrons are released at the anode per Equation 2 (The Anode Half-Cell Reaction). While the reaction at the cathode occurs as per Equation 3 (Cathode Half-Cell Reaction).

The electrodialysis structure illustrated in FIG. 5 produces less oxygen and hydrogen gas than electrolysis such as FIG. 1. In a cell such as FIG. 1, one mole of hydrogen and one-half mole of oxygen are produced for each mole of sulfuric acid and each two moles of sodium hydroxide produced. One mole of sodium sulfate is consumed for two make of NaOH or one mole of $H_2SO_4$ produced.

In the cell assembly of FIG. 5, only one-half mole of oxygen and one mole of $H_2$ is produced for each three moles of $H_2SO_4$ or six moles of NaOH produced. The number of half-cells (chambers 16, 19, 21, 23, 25 and 27) may be any desired number although internal resistance of such an assembly of cells is additive and the energy consumed by each electrolyte reaction is not altered by this serial arrangement of half cells. However, whenever maximum production of NaOH and/or $H_2SO_4$ is desired with a minimum production of gases ($H_2$ and $O_2$), then an electrodialysis structure such as that illustrated in FIG. 5 is very useful.

Proton conductors useful in the instant invention include Nafion ®, barium cerate ($BaCeO_3$), strontium cerate ($SrCeO_3$) and the like. Suitable proton conductors operable at the modest temperatures involved and having acid and alkali resistance, especially ceramic proton conductors, are well known in the art.

What is claimed is:

1. An electrolyte cell for producing sodium hydroxide from a sodium salt derived from a strong acid comprising:
   an anode chamber;
   a cathode chamber;
   an acid resistant, electronically conductive anode positioned in said anode chamber;
   a caustic resistant, electronically conductive cathode positioned in said cathode chamber; and
   a solid, impervious sodium ion conducting, electronically insulating, homogeneous inorganic, membrane separating the anode chamber from the cathode chamber, said membrane being resistant to water, acid and caustic.

2. The electrolytic cell of claim 1 wherein said membrane is a ceramic material.

3. The electrolyte cell of claim 2 wherein said ceramic material is a sodium super ion conductor material having the formula $Na_{1+x}Zr_2P_{3-x}Si_xO_{12}$ where x is $0 < X < 3$.

4. The electrolytic cell of claim 3 wherein said ceramic material has a density of greater than 95% of theoretical density.

5. The electrolytic cell of claim 3 wherein said membrane is in the form of a closed end tube.

6. The electrolyte cell of claim 1 wherein said homogeneous inorganic membrane is contacted with a chemically stable polymer to provide a layered membrane structure.

7. The electrolyte cell of claim 6 wherein said homogeneous inorganic membrane is a sodium super ion conductor material having the formula $Na_{1+x}Zr_2P_{3-x}Si_xO_{12}$ where x is $0 < X < 3$ and wherein said polymer is selected from a class of polymers having the formula:

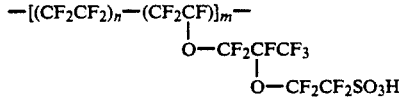

where "n" denotes at least one $CF_2CF_2$ sequence and "m" indicates at least one polymer chain.

8. The electrolyte cell of claim 6 wherein said membrane is in the form of a closed end tube.

9. The electrolyte cell of claim 1 wherein said inorganic membrane has a thickness less than about 1.5 mm.

10. The electrolyte cell of claim 1 wherein said membrane is a thin, substantially planar structure.

11. The electrolytic cell of claim 1 wherein at least two anode chambers are present.

12. The electrolyte cell of claim 1 wherein at least two cathode chambers are present.

13. The electrolytic cell of claim 1 wherein a plurality of cells are positioned serially with a protonconducting membrane alternating with said sodium ion-conducting membranes.

14. The electrolyte cell of claim 1 wherein one terminal cell is a catholyte cell containing a cathode and the other terminal cell is an anolyte cell containing an anode.

15. An electrolytic cell for producing sodium hydroxide from an aqueous sodium salt solution derived from a strong acid comprising:
   an anode chamber;
   a cathode chamber;
   an acid resistant, electronically conductive anode positioned in said anode chamber;
   a caustic resistant, electronically conductive cathode positioned in said cathode chamber; and
   a solid, impervious sodium ion conducting, electronically insulating membrane separating the anode chamber from the cathode chamber, said membrane resistant to acid and caustic and comprising a homogeneous inorganic membrane formed from a sodium super ion conductor material having the formula $Na_{1+x}Zr_2P_{3-x}Si_xO_{12}$ where x is $0 < X < 3$ which is contacted with a chemically stable polymer selected from the class of polymers having the formula:

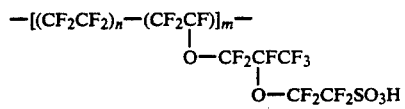

where "n" denotes at least one $CF_2CF_2$ sequence and "m" indicates at least one polymer chain.

16. An electrolytic process for producing concentrated sodium hydroxide solution from an aqueous sodium salt solution having anions derived from a strong acid comprising:
   introducing electrons into an aqueous catholyte solution containing sodium hydroxide;
   removing electrons from an aqueous anolyte solution containing sodium cations and anions from an acid;
   conducting sodium ions through a solid integral, monolithic separator isolating said anolyte solution from said catholyte solution, said monolithic separator containing mobile sodium ions contained in the lattice of said separator to produce a concentrated solution of sodium hydroxide in said catholyte solution;
   producing oxygen gas in said anolyte;
   producing hydrogen gas in said catholyte;
   producing an acid from the anions in said anolyte.

17. The electrolytic process of claim 16 wherein said concentrated solution of sodium hydroxide is as much as 40% by weight NaOH.

18. The electrolytic process of claim 16 wherein said anolyte solution contains a sodium salt selected from the class consisting of sodium sulfate, sodium chloride, sodium chlorate, sodium chlorite, sodium nitrate, sodium phosphate, sodium perchlorate, sodium nitrite and sodium carbonate.

19. The electrolytic process of claim 18 wherein said salt is sodium sulfate.

20. The electrolytic process of claim 18 wherein said salt is sodium chlorate.

21. The electrolytic process of claim 18 wherein said salt is sodium carbonate.

22. The electrolytic process of claim 18 wherein said salt is sodium chlorite

23. The electrolytic process of claim 18 wherein said salt is sodium nitrate.

24. The electrolytic process of claim 18 wherein said salt is sodium nitrite.

25. The electrolytic process of claim 18 wherein said salt is sodium perchlorate.

26. The electrolytic process of claim 18 wherein said salt is sodium phosphate.

27. The electrolytic process of claim 18 wherein said salt is sodium chloride.

28. The electrolytic process of claim 16 wherein the temperature of operation is as great as 100° C.

29. The electrolytic process of claim 16 wherein the temperature of operation is about 85° C.

30. The electrolytic process of claim 13 wherein the operating pressure is about atmospheric.

31. The process of claim 16 wherein the operating pressure is superatmospheric.

32. The process of claim 16 wherein the process is operated to produce a concentrated acid solution in the 33. The electrolyte process of claim 16 wherein the temperature of operation is at least 65° C.

34. The electrolyte process of claim 16 wherein the temperature of operation is ambient to about 85° C.

* * * * *

UNITED STATES PATENT AND TRADEMARK OFFICE
CERTIFICATE OF CORRECTION

PATENT NO. : 5,290,405

DATED : March 1, 1994

INVENTOR(S) : Joshi et al.

It is certified that error appears in the above-identified patent and that said Letters Patent is hereby corrected as shown below:

On the title page under "U.S. PATENT DOCUMENTS," insert --4,248,715 1/1981 Olivier 204/260--;

On the first page, in the title, change "NAOH" to --NaOH--;

In the Abstract, line 1, change "A" to --An--;

In Column 1, in the title, change "NAOH" to --NaOH--;

In Column 1, line 14, after "production" insert --of caustic, and--;

In Column 2, line 25, change "causticpro-" to --caustic-pro- --;

In Column 2, line 60, change "polymerwrapped" to --polymer-wrapped--;

In Column 3, line 13, change ($Na_{1+z}Zr_2P_{3-x}Si_xO_{12}$) to --($Na_{1+x}Zr_2P_{3-x}Si_xO_{12}$)--

In Column 3, line 22, change "thinfilm" to --thin-film--;

In Column 3, line 39, change "$Na_2SO_4 + H_2ONa^{++}H_2SO_4 + 2e + \frac{1}{2}O_2\rightarrow$" to --$Na_2SO_4 + H_2O \rightarrow 2Na^+ + H_2SO_4 + 2e^- + \frac{1}{2}O_2\uparrow$--;

In Column 3, line 40, change "$2Na^{++}2H_2O + 2e \rightarrow 2NaOH + H_2\rightarrow$" to --$2Na^+ + 2H_2O + 2e^- \rightarrow 2NaOH + H_2\uparrow$--;

In Column 3, line 55, change "$2NaOH + H_2SO_4 \rightarrow \frac{1}{2}O_2 + Na_2SO_4 + H_2O$" to --$2NaOH + H_2SO_4 \rightarrow \frac{1}{2}O_2 + H_2 + Na_2SO_4 + H_2O$--;

In Column 4, line 35, insert a period after "processing";

In Column 4, line 49, insert a period after "supports";

UNITED STATES PATENT AND TRADEMARK OFFICE
CERTIFICATE OF CORRECTION

PATENT NO. : 5,290,405

DATED : March 1, 1994

INVENTOR(S) : Joshi et al.

It is certified that error appears in the above-identified patent and that said Letters Patent is hereby corrected as shown below:

In Column 5, line 4, change "selectively" to --selectivity--;

In Column 5, line 23, preceding "di-" insert --(--;

In Column 6, line 37, insert a period after "voltage";

In Column 7, line 2, insert a period after "density";

In Column 7, line 19, change "TiB" to --$TiB_2$--;

In Column 8, line 59, change "diffusionlayer" to --diffusion-layer--;

In Column 9, line 23, insert a period after "electrodes";

In Column 9, line 29, change "2" to --12--;

In Column 9, line 31, insert a period after "conductivity";

In Column 9, line 35, insert a period after "kinetics";

In Column 9, line 48, insert a period after "density";

In Column 9, line 49, change "8°" to --85°--;

In Column 10, line 2, change "$Na_+$-" to --$Na^+$ --;

In Column 10, lines 8, 26, 43, 45, 48, 50, 52, and 53, change "Nafion®" to --Nafion®--;

In Column 11, lines 3, 5, 6, 15, 23, 38, and 40, change "Nafion®" to --Nafion®--;

UNITED STATES PATENT AND TRADEMARK OFFICE
CERTIFICATE OF CORRECTION

PATENT NO. : 5,290,405

DATED : March 1, 1994

INVENTOR(S) : Joshi et al.

It is certified that error appears in the above-identified patent and that said Letters Patent is hereby corrected as shown below:

In Column 11, line 8, change "4" to --14--;

In Column 11, line 36, insert a period after "membrane";

In Column 11, line 47, change "$2NaClO_3 + 3H_2O\uparrow\ 2NaOH + 2HClO_3 + H_2\rightarrow + \frac{1}{2}O_2\uparrow$" to --$2NaClO_3 + 3H_2O \rightarrow 2NaOH + 2HClO_3 + H_2\uparrow + \frac{1}{2}O_2\uparrow$--;

In Column 11, line 52, before the equation insert --(anode)--;

In Column 11, line 52, change "$2NaClO_3 + H_2O \rightarrow 2Na^+ + 2HC_2\rightarrow$" to --$2NaClO_3 + H_2O \rightarrow 2Na^+ + 2HClO_3 + \frac{1}{2}O_2\uparrow + 2e^-$--;

In Column 11, line 53, insert --(cathode) $2Na^+ + 2H_2O + 2e^- \rightarrow 2NaOH + H_2\uparrow$ --;

In Column 12, line 18, change "$Na_2CO_3 + 3H_2O \rightarrow 2NaOH + H_2CO_3 + H\frac{1}{2}O_2 \rightarrow + H_2 \rightarrow$" to --$Na_2CO_3 + 3H_2O \rightarrow 2NaOH + H_2CO_3 + \frac{1}{2}O_2\uparrow + H_2\uparrow$--;

In Column 12, line 23, change "$Na_2CO_3 + H_2O \rightarrow 2Na^+ H_2CO_3 + 2e^- + \frac{1}{2}O_2 \rightarrow$" to --$Na_2CO_3 + H_2O \rightarrow 2Na^+ + H_2CO_3 + 2e^- + \frac{1}{2}O_2\uparrow$--;

In Column 12, line 25, at the end of the equation change "$\rightarrow$" to --$\uparrow$--;

In Column 12, line 41, change "$NaNO_3 + 1\frac{1}{2}H_2O \rightarrow NaOH + HNO_3 + \frac{1}{4}O_2 \rightarrow + \frac{1}{2}H_2 \rightarrow$" to --$NaNO_3 + 1\frac{1}{2}H_2O \rightarrow NaOH + HNO_3 + \frac{1}{4}O_2\uparrow + \frac{1}{2}H_2\uparrow$--;

In Column 12, line 43, at the end of the equation change "$\rightarrow$" to --$\uparrow$--;

In Column 12, line 45, change "$Na^+ H_2O + e^- NaOH + \frac{1}{2}H_2 \rightarrow$" to --$Na^+ + H_2O + e^- \rightarrow NaOH + \frac{1}{2}H_2\uparrow$--;

In Column 12, line 62, change "$/_2O_2\rightarrow + 3H_2\rightarrow$" to --$^3/_2 O_2\uparrow + 3H_2\uparrow$--;

In Column 12, line 65, change "$\rightarrow$" to --$\uparrow$--;

UNITED STATES PATENT AND TRADEMARK OFFICE
CERTIFICATE OF CORRECTION

PATENT NO. : 5,290,405

DATED : March 1, 1994

INVENTOR(S) : Joshi et al.

It is certified that error appears in the above-identified patent and that said Letters Patent is hereby corrected as shown below:

In Column 12, line 67, at the end of the equation, change "$\rightarrow$" to --$\uparrow$--;

In Column 13, line 18, at the end of the equation, change "$\rightarrow$" to --$\uparrow$--;

In Column 13, line 20, change "$2Na^+ + 2H_2O + 2e^- 2NaOH + H_2\rightarrow$" to --$2Na^+ + 2H_2O + 2e^- \rightarrow 2NaOH + H_2\uparrow$--;

In Column 13, line 35, in the equation change "½$\uparrow$" to --½$O_2\uparrow$--;

In Column 13, line 54, change "$2NaClO + 3H_2O \rightarrow 2NaOH + 2HClO_{30 \times O2}\uparrow + H_2\uparrow$" to --$2NaClO + 3H_2O \rightarrow 2NaOH + 2HClO + ½O_2\uparrow + H_2\uparrow$--;

In Column 13, line 57, in the equation after "$H_2O$" change the "$\uparrow$" to --$\rightarrow$--;

In Column 13, line 59, in the equation after "$2e^-$" change the "$\uparrow$" to --$\rightarrow$--;

In Column 13, line 65, insert a period after "solution";

In Column 14, line 9, change "6" to --16--;

In Column 14, line 51, change "make" to --moles--;

In Column 15, line 4, change "electrolyte" to --electrolytic--;

In Column 15, line 14, delete the comma after "inorganic";

In Column 15, line 20, change "electrolyte" to --electrolytic--;

In Column 15, line 29, change "electrolyte" to --electrolytic--;

UNITED STATES PATENT AND TRADEMARK OFFICE
CERTIFICATE OF CORRECTION

PATENT NO. : 5,290,405

DATED : March 1, 1994

INVENTOR(S) : Joshi et al.

It is certified that error appears in the above-indentified patent and that said Letters Patent is hereby corrected as shown below:

In Column 15, line 33, change "electrolyte" to --electrolytic--;

In Column 15, line 46, change "electrolyte" to --electrolytic--;

In Column 15, line 48, change "electrolyte" to --electrolytic--;

In Column 15, line 50, change "electrolyte" to --electrolytic--;

In Column 15, line 54, change "electrolyte" to --electrolytic--;

In Column 15, line 57, change "protonconducting" to --proton-conducting--;

In Column 15, line 60, change "electrolyte" to --electrolytic-- and change "1" to --13--;

In Column 16, line 8, after "brane" insert --is--;

In Column 17, line 8, change "13" to --16--;

In Column 18, line 4, after "the" insert --anolyte.--;

UNITED STATES PATENT AND TRADEMARK OFFICE
CERTIFICATE OF CORRECTION

PATENT NO. : 5,290,405
DATED : March 1, 1994
INVENTOR(S) : Joshi, et al

It is certified that error appears in the above-indentified patent and that said Letters Patent is hereby corrected as shown below:

In Column 18, line 5, change "electrolyte" to --electrolytic--;
In Column 18, line 7, change "electrolyte" to --electrolytic--;

Signed and Sealed this

Twenty-seventh Day of September, 1994

Attest:

BRUCE LEHMAN

Attesting Officer    Commissioner of Patents and Trademarks